(12) United States Patent
Sørensen (10) Patent No.: US 10,781,797 B2
(45) Date of Patent: Sep. 22, 2020

(54) WIND TURBINE COMPRISING A YAW BEARING SYSTEM

(71) Applicant: Envision Energy (Denmark) ApS, Silkeborg (DK)

(72) Inventor: Carsten Bendix Sørensen, Højbjerg (DK)

(73) Assignee: Envision Energy (Denmark) ApS, Silkeborg (DK)

( * ) Notice: Subject to any disclaimer, the term of this patent is extended or adjusted under 35 U.S.C. 154(b) by 0 days.

(21) Appl. No.: 16/087,759

(22) PCT Filed: Mar. 21, 2017

(86) PCT No.: PCT/DK2017/050080
§ 371 (c)(1),
(2) Date: Sep. 24, 2018

(87) PCT Pub. No.: WO2017/162250
PCT Pub. Date: Sep. 28, 2017

(65) Prior Publication Data
US 2019/0113026 A1 Apr. 18, 2019

(30) Foreign Application Priority Data

Mar. 23, 2016 (DK) ................................ 2016 70170

(51) Int. Cl.
*F03D 80/70* (2016.01)
*F16C 17/10* (2006.01)
(Continued)

(52) U.S. Cl.
CPC ............ *F03D 80/70* (2016.05); *F16C 17/107* (2013.01); *F16C 17/26* (2013.01); *F03D 7/0204* (2013.01);
(Continued)

(58) Field of Classification Search
CPC ........ F16C 17/10; F16C 17/107; F16C 17/26; F16C 43/02; F16C 2360/31; F03D 80/70
See application file for complete search history.

(56) References Cited

U.S. PATENT DOCUMENTS 8,936,397 B2    1/2015  Pedersen et al.
9,562,514 B2 *  2/2017  Pasquet ................ F03D 7/0224
(Continued)

FOREIGN PATENT DOCUMENTS

CN    201650589 U    11/2010
CN    102825420 A    12/2012
(Continued)

*Primary Examiner* — James Pilkington
(74) *Attorney, Agent, or Firm* — James Creighton Wray (57) ABSTRACT

The invention relates to a wind turbine comprising a plurality of individual yaw bearing units and a method of replacing a pad of such a yaw bearing unit. The yaw bearing unit comprises a caliper structure divided into an upper portion and a lower portion, wherein the lower portion can be dismounted without also dismounting the upper portion. An upper pad is provided between a flange providing support for a nacelle and a mainframe of the nacelle. A radial pad is arranged on a radial surface of the upper portion and contacts a stop element located at either ends of the upper portion. An adjustable lower pad is arranged in a through hole in the lower portion and can be replaced via a lower opening in the lower portion. The radial pad can be replaced in a sideward direction by removing one of the stop elements or replacing it in an axial direction by removing the lower portion.

9 Claims, 9 Drawing Sheets

(51) Int. Cl.
  *F16C 17/26* (2006.01)
  *F03D 7/02* (2006.01)
(52) U.S. Cl.
  CPC ....... *F05B 2230/80* (2013.01); *F16C 2360/31* (2013.01); *Y02E 10/72* (2013.01)

(56) References Cited

U.S. PATENT DOCUMENTS

2011/0233939 A1* 9/2011 Noda ................... F03D 80/70
                                                       290/55
2011/0254281 A1   10/2011 Noda

FOREIGN PATENT DOCUMENTS

| | | |
|---|---|---|
| CN | 103016275 A | 4/2013 |
| DE | 10 2007 056 763 A1 | 12/2008 |
| DE | 202011102602 U1 | 10/2011 |
| EP | 1365147 A2 | 11/2003 |
| EP | 1571334 A1 | 9/2005 |
| EP | 2447531 A1 | 5/2012 |
| WO | 2008077983 A1 | 7/2008 |

\* cited by examiner

WIND TURBINE COMPRISING A YAW BEARING SYSTEM

This application claims the benefit of Danish Application No. PA 2016 70170 filed Mar. 23, 2016 and PCT/DK2017/050080 filed Mar. 21, 2017, International Publication No. WO 2017/162250 A1, which are hereby incorporated by reference in their entirety as if fully set forth herein.

FIELD OF THE INVENTION

The present invention relates to a wind turbine comprising a wind turbine tower, a nacelle with a mainframe, and a ring gear and a flange arranged on the wind turbine tower, the ring gear being configured to engage at least one drive unit configured to yaw the nacelle relative to the wind turbine tower, wherein the mainframe is slidable supported on the flange by a plurality of individual yaw bearing units arranged relative to each other, the yaw bearing unit comprising a yaw caliper structure configured to be mounted to the mainframe, wherein an upper pad is arranged between the mainframe and the flange, and wherein a radial pad and a lower pad project from the caliper structure and contact the flange.

BACKGROUND OF THE INVENTION

The method of using a yaw sliding bearing system when yawing the nacelle relative to the wind turbine tower, wherein the mainframe of the nacelle is slidable supported by a flange provided at the top of the wind turbine tower is already known. The nacelle is yawed by means of motors which, in turn, cause the lower surface of the mainframe to slide along a sliding surface on a sliding pad on the flange. The bearing system is an adjustable pre-tensioning system continuously applying a brake torque on the flange by means of friction. Such passive systems are often configured as large and heavy units which are difficult to handle. Such passive systems are also expensive to manufacture and are costly and time consuming to service. Another yaw braking system is used to brake the yaw motion of the nacelle and keep the nacelle in a desired angular position. Such a yaw braking system may utilise a brake disc and corresponding brake calipers to apply a braking force to the nacelle.

EP 1571334 A1 discloses a plurality of individual yaw bearing units arranged between the wind turbine tower and the mainframe of the nacelle. Each bearing unit comprises an upper pad arranged between the mainframe and the support flange and an L-shaped caliper structure mounted to the mainframe. A radial pad is arranged between the radial end surface of the flange and an axial extending leg of the caliper structure. A lower adjustable pad is arranged in a radial extending leg of the caliper structure. The caliper structure is made of a single large and heavy piece and has to be removed in order to provide access to the individual pads. This is time consuming and adds to the total service costs. Separate fixing elements are arranged between two adjacent bearing units and mounted to the frame, wherein each individual fixing element contacts the adjacent sets of radial and upper pads and keep them in place during yawing. These fixing elements further add to the complexity and costs of the bearing units.

EP 2447531 A1 discloses various embodiments of a yaw sliding bearing system. In one embodiment a plurality of individual yaw bearing units are distributed along the circumference of the flange. Each yaw bearing unit has an L-shaped caliper structure mounted to the mainframe of the nacelle. An upper sliding pad is arranged between the mainframe and the flange, while an adjustable sliding pad is arranged in the radial extending leg of the caliper structure. A plurality of adjustable roller elements is arranged in the axial extending leg of the caliper structure. The roller elements require regular maintenance to prevent blockage of their rotating motion which adds to the total service costs. Secondly, the caliper structure requires complex machining in order to enable the mounting of the roller elements which, in turn, adds to the total costs of the bearing units. Thirdly, the caliper structure is made from one single piece and has to be removed in order to provide access to the roller elements and sliding pads.

EP 2447531 A1 further discloses in another embodiment that a single bearing unit extends along the entire circumference of the ring gear wherein the caliper structure thereof has an upper ring-shaped portion and a lower ring-shaped portion. The upper portion is mounted to the mainframe and the lower portion is mounted to the upper portion. The flange is positioned between the radial extending legs of the U-shaped caliper structure and the sliding pads are arranged on opposite facing sides of these radial legs. The roller elements are non-adjustable roller elements and are arranged between the radial legs. The use of roller elements requires regular maintenance and complex machining of the caliper structure as mentioned above. The ring-shaped caliper structure forms a large and heavy item which is difficult to handle and increases the total weight of the bearing unit.

DE 202011102602 U1 discloses a yaw slinging bearing unit comprising a U-shaped caliper structure. In one embodiment, the caliper structure is formed by a single piece defining the radial legs. In another embodiment, the caliper structure is mounted to a radial extending plate having a cut-out or recess in which the upper pad is arranged. The plate is situated between the mainframe of the nacelle and the caliper structure. The radial pad is arranged on a pressure plate both of which are fixed to a radial surface of the caliper structure by means of bolts and screws. This reduces the contact surface area in the radial direction and, in turn, increases the pressure on the radial surface. This increases the risk of the radial pad being squeezed out during yawing and of the flange edge rubbing against the bolt heads potentially breaking off the bolt heads.

OBJECT OF THE INVENTION

An object of the invention is to provide a yaw bearing system solving the above-mentioned problems.

Another object of the invention is to provide a yaw bearing system that has improved extreme and fatigue strength.

Yet another object of the invention is to provide a yaw bearing system that has a reduced risk of the radial pad being squeezed out between the caliper and the yaw gear.

A further object of the invention is to provide a yaw bearing system that optimises the costs of servicing the yaw bearing system as well as replacing sliding pads.

Another object of the invention is to provide a quick and simple method of replacing a radial pad of the yaw bearing system.

DESCRIPTION OF THE INVENTION

As mentioned above, the invention comprises a wind turbine comprising a wind turbine tower, a nacelle with a mainframe, a ring gear and a flange provided at top of the wind turbine tower, the ring gear being configured to engage at least one drive unit for yawing the nacelle relative to the wind turbine tower, the flange having an upper surface, a lower surface, and a radial surface. The mainframe has a lower surface of facing the upper surface of the flange. The mainframe is slidable and supported on the flange by a plurality of individual yaw bearing units arranged relative to each other. Each yaw bearing unit has a separate caliper structure, the caliper structure having an upper portion with an upper surface and a lower portion with an upper surface of the lower portion; the upper portion having a radial surface facing the radial surface of the flange and an upper surface of lower portion facing the lower surface of the flange. At least one upper pad is arranged between the upper surface of the flange and the lower surface of the mainframe. At least one radial pad is arranged between the radial surface of flange and the radial surface of upper portion. The at least one radial pad has a lower edge contacting the upper surface of the lower portion and extends along the entire length of the radial surface of the upper portion.

This provides an improved yaw bearing system that is cheaper to manufacture and less costly to service. The yaw bearing system also saves weight of the individual yaw bearing units compared to other conventional yaw bearing units, thus making it easier to handle. The present configuration further allows the lower and radial pads to be replaced and/or serviced without having to dismount the entire caliper structure. The present yaw bearing system is suitable for any type of wind turbine using a ring gear and a passive yaw braking system. The present configuration is also suitable for use in wind turbines with increased loads.

At least one upper pad and at least one lower pad are arranged relative to opposite sides of the flange. At least one further pad, i.e. the radial pad, is arranged relative to an end surface of the flange. The radial pad is advantageously arranged on an axial extending portion or leg of the caliper structure. The lower pad is advantageously arranged, at least partly, in a radial extending portion or leg of the caliper structure. Radial forces acting on the radial pad due to radial movement of the nacelle are transferred to the flange and, in turn, to the wind turbine tower. This radial displacement relative to a centre axis of the wind turbine tower may be caused by the wind acting on the rotor or when the nacelle is yawing. The radial pad prevents metal-to-metal contact between the caliper structure and the flange and also reduces the radial displacement.

The flange may be formed as a separate component arranged relative to the ring gear and mounted to the wind turbine tower. The flange may alternatively be an integrated part of the ring gear. The ring gear may have a plurality of teeth configured to engage complementary teeth on one or more drive units, e.g. on a pinion gear connected to a respective yaw motor. The flange extends inwards in a radial direction towards the centre axis of the wind turbine tower. The teeth of the ring gear may face in the same radial direction or in the opposite direction. The drive unit may be any suitable drive unit capable of yawing the nacelle relative to the wind turbine tower. The ring gear may thus act as a yaw gear wherein the drive unit yaws the nacelle relative to the wind turbine tower, and optionally applies a braking torque to the nacelle.

According to one embodiment, the yaw bearing unit further comprises at least one removable stop element configured to be mounted to at least one side surface of the upper portion, wherein the at least one radial pad extends along the entire length of the radial surface of upper portion.

The caliper structure, e.g. the upper portion, may comprise a radial surface facing a corresponding radial surface, i.e. end surface on the flange. Furthermore, the caliper structure may have two opposite facing side surfaces, each facing an adjacent yaw bearing unit. A projecting element may be arranged at an upper edge of the radial surface of the caliper structure. This projecting element may have an elongated profile and may act as a shoulder for the radial pad. The projecting element may have a predetermined height, width, and length. A rebate configured to receive and hold the radial pad may be formed adjacent to this projecting element. The rebate may extend along the entire length (in the circumference or tangential direction) of the radial surface. This rebate may further extend from a lower surface of the projecting element to a lower edge of the radial surface. The radial pad may have a predetermined width and length corresponding to the width and length of the rebate. This increases the total surface area for the radial pad which, in turn, reduces the force acting on the stop element. This further reduces the wear on the radial pad and reduces the risk of the radial pad being squeezed out during yawing.

The radial pad of a conventional yaw bearing system is placed in a recess formed in the radial surface and is fixated by means of screws to the caliper structure. In other conventional yaw bearing systems, the radial pad is fixed by screws to a pressure plate surrounding the entire circumference of the radial pads. Both solutions reduce the total contact surface area, thereby increasing the force acting on the shoulders or screws. This increases the risk of the radial pad being squeezed out or the screws failing.

At least one stop element may be arranged relative to one or both side edges of the radial surface. The stop element may be a removable stop element configured to be mounted to a side surface of the caliper structure, e.g. to the upper portion. The stop element may be mounted to the caliper structure by means of screws, bolts, or other suitable fasteners. The stop element may contact a side edge of the radial pad when mounted and may have a radial end surface facing the flange when mounted. This end surface may be flushed or placed in a retracted position relative to a radial end surface of the projecting element. The radial pad may have a thickness which extends beyond the depth of the rebate. This prevents the radial pad from sliding beyond the edge of the caliper structure in the circumference direction. Retracting the end surfaces of the stop element and projection element prevents the radial surface of the flange from coming into metal-to-metal contact with these end surfaces when the radial pad is worn down.

The distance or clearance between the two opposite facing radial surfaces of the flange and caliper structure may be selected to ensure a proper engagement between the ring gear and the drive unit. This may be achieved by optimal design of the yaw bearing system and flange via simulations or by outfitting the caliper structure with an adjusting mechanism for adjusting the pre-tension force of the radial pad.

According to one embodiment, said caliper structure comprises an upper portion extending in an axial direction and a removable lower portion extending in a radial direction when mounted, wherein the upper portion is configured to be mounted to the mainframe and the lower portion is configured to be mounted to the upper portion.

The caliper structure may be machined into the desired shape instead of being moulded into the desired shape as when conventionally used. This in turn eliminates the need for a mould thus saving manufacturing costs and manufacturing time. This further enables an improved control in the manufacturing process since the formation of voids and dross in the caliper structure can be reduced which results in fewer rejected items.

The caliper structure is divided into two or more portions which can be manufactured and handled individually during assembly and servicing. The present caliper structure, i.e. the individual portions thereof, has a simplified configuration which in turn improves the extreme and fatigue strength of the present yaw bearing unit. The caliper structure may be made of a high-strength material, such as structural steel or other suitable materials, which can be machined, e.g. cut, into the desired configuration. This reduces the costs of the yaw bearing system. Conventional caliper structures are made of a more costly material, such as cast iron, moulded into the desired configuration.

The present configuration also eliminates any fillet stress since the caliper structure is divided into at least two portions. This also allows for a greater distance between the flange and the caliper structure which, in turn, reduces the risk of interference. Conventional yaw bearing systems with a single L-shaped caliper structure have a fillet located at the intersection between the two legs which forms a stress hot-spot.

According to one embodiment, said lower portion comprises at least one through hole connected to a first opening in the upper surface of lower portion and a second opening in a lower surface of lower portion, wherein at least one lower pad is at least partly positioned inside said at least one through hole and is contacting the lower surface of flange, the at least one lower pad being accessible via the second opening.

Axial forces acting on the flange due to the weight of the nacelle, and in part the rotor, are transferred to the flange via the upper pad. Tilting moments acting on the rotor and, in turn, on the nacelle, are further transferred to the flange via the lower pad and upper pad.

The lower pad may be formed by a single pad, a plurality of individual sub-pads, or a combination thereof. The caliper structure, e.g. the lower portion, may comprise one or more through holes distributed along the length of the caliper structure. Each through hole may extend in an axial direction between two opposite facing openings on the caliper structure. The lower pads may be arranged in each individual through hole and at least partly extend outwards in the axial direction towards the flange when mounted. The lower pads may be connected to fastening means, e.g. a treated bushing or another suitable fastener element, configured to mount the lower pad to the caliper structure or an adjusting mechanism as described below. The lower pad may then be placed in a predetermined position relative to the caliper structure.

The lower portion, the upper portion, the ring gear, and/or the flange may be coated with an anti-corrosive layer to prevent corrosion of the metal parts. The anti-corrosive layer may be zinc, zinc alloy, aluminium, aluminium alloy, epoxy, polyurethane, or another suitable material or alloy.

According to one embodiment, at least one of the radial pad, lower pad or upper pad is connected to an adjusting mechanism configured to adjust a pre-tension force of that pad.

The adjusting mechanism may be positioned and mounted directly inside the through hole or be arranged in an outer housing which, in turn, may be mounted to the caliper structure. The lower pad and adjusting mechanism may thus be accessed via a lower opening in the caliper structure without having to remove the entire caliper structure. This allows for a significant shortening of the total servicing time and reduces the total servicing costs.

A recess is formed in conventional yaw bearing systems in which the lower pad and the adjusting mechanism are positioned. A small through hole is formed below the recess wherein the shaft of the adjustable bolt is inserted from the opposite side of the caliper structure. In order to replace the lower pad and the adjusting mechanism, the entire caliper structure has to be removed which significantly adds to the total servicing time and the overall servicing costs.

The adjusting mechanism may be configured to adjust the pre-tension force of the lower pad which in turn defines the friction force applied by the lower pad on the flange. The adjusting mechanism may comprise a support element, e.g. a piston head, on which the lower pad is arranged. The support element may further be connected to a shaft element, e.g. a piston rod, configured to contact an adjustable element at a stop position. A spring element, e.g. a Belleville spring, may be arranged between the support element and the adjustable element for biasing the lower pad towards the flange. The adjustable element may comprise means, e.g. a bolt head, for engaging an external tool. The adjustable element may be mounted to the caliper structure, e.g. by means of a treated coupling located in the side surface of the adjustable element and the through hole respectively. Optionally, at least the spring element may be partly or fully submerged in a lubricant, such as oil or grease, to prevent corrosion. This enables the adjusting mechanism and the lower pad to be mounted and dismounted in parts or as one combined unit. The adjusting mechanism may further be outfitted with optional locking means for preventing the adjustable element from loosening.

An optional sleeve may be arranged relative to the support element and lower pad, wherein the support element and lower pad may move in an axial direction along the sleeve. The sleeve may be made of or be coated with a low-friction material, such as fluoropolymer like polytetrafluoroethylene or another suitable material. This provides a non-stick surface for the lower pad to move along which reduces the amount of force required to move the lower pad.

According to one embodiment, said caliper structure comprises at least two rows of mounting elements, e.g. mounting holes, for mounting to the mainframe.

The lower and upper portions of the caliper structure may comprise two or more rows of mounting elements arranged relative to the lower pads. The mounting elements may be mounting holes for receiving separate fastener elements, such as bolts, screws, or suitable fastener elements. Each row may comprise two, three, four, or more mounting elements. Other types of mounting elements may be used. These mounting elements allow the caliper structure to be mounted to complementary mounting or fastener elements in the mainframe. This enables the forces acting on the caliper structure to be distributed over the individual fastener elements. This eliminates any hot-spots in the caliper structure which would otherwise result in added stress, potentially causing the caliper structure to fail. This also improves the bolt phi factor and increases the slippage safety factor compared to a single row of mounting elements. This further allows for a greater total pre-tension force compared to a single row of bolts.

A third set of mounting elements, e.g. mounting holes, may be arranged in the upper portions for receiving additional fastener elements, such as bolts, screws, or the like. The third set may comprise two, three, four or more mounting elements. This allows the lower and upper portions to be mounted and dismounted individually.

According to one embodiment, said caliper structure has a radial distance measured between a lower pad and a mounting element, e.g. a mounting hole, for mounting to the mainframe, wherein the radial distance is between 80 millimetres and 100 millimetres.

The present configuration enables the distance, measured in the radial direction between a centre axis of one lower pad and a centre axis of one mounting element in an adjacent row, to be reduced. The distance may be reduced to a range of 80 millimetres to 100 millimetres. This reduces the eccentricity and the bolt force when the caliper structure is subjected to heavier loads due to the wind. This also allows for a reduced width of the yaw bearing system and a reduced width of the flange.

According to one embodiment, a number of yaw bearing units are distributed along the circumference of the flange, the number being between 15 and 25.

The present configuration further enables the number of individual yaw bearing units along the circumference of the flange to be increased. This may be achieved by reducing the number of individual lower pads in each yaw bearing unit. The number may be reduced from 7 or more to a range of 2 to 6. This allows the weight of each yaw bearing unit to be reduced compared to conventional yaw bearing systems. The lower and upper portion, including the respective pads, may each have a weight of 40 kilograms to 60 kilograms. This saves material and allows for an easier service as well as an easier handling. This also reduces the length and cost of each yaw bearing unit.

Conventional yaw bearing systems often have at least seven individual lower pads which require a large amount of material, which, in turn, adds to the total cost and weight of each yaw bearing unit. Such large and heavy units are difficult to handle and service, particularly if one or more pads have to be replaced.

According to a special embodiment, said at least one upper pad is formed by a single pad made of thermoplastic polymer, the single pad having:
- a length of 120 millimetres to 500 millimetres, the length being measured along a central arc line,
- a width of 100 millimetres to 250 millimetres, the width being measured perpendicular to the central arc line, and/or
- a thickness of 15 millimetres to 20 millimetres, the thickness being measured perpendicular to the central arc line and the width.

Forces acting on the upper pad have to be transferred to the flange via the shoulders surrounding the upper pad. A known problem with conventional upper pads is the surface tension generated during yawing. The method for solving this problem, by reducing the size of the upper pad, is already known. Therefore, conventional yaw bearing systems use five or more small individual upper pads arranged along the length of the yaw bearing unit. However, this reduces the total surface area which leads to increased pressure and wear on each upper pad. Conventional upper pads can for example be made of a composite material consisting of epoxy, carbon and some brake and slid additives. However, such upper pads are produced by using a complex and expensive manufacturing process which increases the cost for each upper pad.

The present configuration enables the total surface area of the upper pad to be increased. This may be achieved by forming a single continuous upper pad having an optimal thickness, width, and length. The upper pad may be positioned in a recess formed in the upper surface of the flange wherein the thickness extends beyond the depth of the recess. An optional lubricant system may be used to lubricate the sliding surface of the upper pad, wherein the wind turbine control system may control the operation of the lubricant system. Such a lubricant system is known to a person skilled in the art and will not be described in details. This increases the total surface area, which, in turn, reduces the pressure and wear on the upper pad. This also allows the shape to be optimised in order to reduce vibrations and stick-slip noise.

The lower pad, radial pad, and/or upper pad may advantageously be made of a thermoplastic polymer, such as polyester, polyurethane, polyamide, polyethylene terephthalate (PETP), or another suitable material. These materials have very high resistance to wear and have a low coefficient of friction. This present configuration eliminates the need for a carrier plate on which the upper pad is situated or a plate for keeping the upper pad in place. This reduces the costs of the yaw bearing unit and eliminates the risk of the carrier or limiting plate coming into metal-to-metal contact with the flange. This also allows for a reduced clearance between the mainframe and the flange since no carrier or limiting plate is required.

Tests have shown that the best effect is achieved if the upper pad has a thickness of 15 millimetres to 20 millimetres, a length of 120 millimetres to 500 millimetres, and a width of 100 millimetres to 250 millimetres. The length is measured along a central arc line of the upper pad, the width is measured perpendicular to the arc line, and the thickness is measured perpendicular to the arc line and the width. This provides an optimal shape for the upper pad as mentioned above.

The optimal shape may be determined using the maximal allowable edge pressure of the upper pad. This maximal allowable value may be inserted into the following equation which may then be solved for the respective thickness, width and length:

$$P_{max} = \frac{4 \cdot M_{xy} \cdot \mu \cdot L}{D^2 \cdot \pi \cdot w \cdot d} \cdot 10^6$$

Where $P_{max}$ is the maximum allowable edge pressure of the upper pad measured in megapascal, $M_{xy}$ is the tilting moment measured in kilonewton meter, $\mu$ is the friction coefficient of the upper pad, L is the length of the upper pad measured in millimetres, D is the slide surface diameter measured in millimetres, w is the width of the upper pad measured in millimetres, and d is the depth of the recess in which the upper pad is placed. The slide surface diameter may be determined as the average diameter of the upper surface of the yaw ring, e.g. the flange. The depth indicates the thickness located in the recess, i.e. the part of the upper pad embedded or located within the recess.

The invention also comprises a method for replacing a pad of a yaw sliding bearing unit of a wind turbine, the wind turbine comprising a wind turbine tower, a nacelle with a mainframe, a ring gear and a flange provided at the top of the wind turbine tower, the ring gear being configured to engage at least one drive unit for yawing the nacelle relative to the wind turbine tower, the flange having an upper surface of flange, a lower surface of flange, and a radial surface of flange, the mainframe having a lower surface of mainframe facing the upper surface of flange, wherein the mainframe is slidable supported on the flange by a plurality of individual yaw bearing units arranged relative to each other, each yaw bearing unit comprising a separate caliper structure having an upper portion with an upper surface of upper portion and a lower portion with an upper surface of lower portion; the upper portion having a radial surface of upper portion facing the radial surface of flange and an upper surface of lower portion facing the lower surface of flange, wherein at least one radial pad is arranged between the radial surface of flange and the radial surface of upper portion, wherein the method comprises the steps of:

dismounting a lower portion of the caliper structure,
    removing an old radial pad by moving said old radial pad in one axial direction relative to the radial surface of upper portion,
    moving a new radial pad into position by moving the new radial pad in the opposite axial direction relative to the radial surface of upper portion, and
    remounting the lower portion of the caliper structure.

The present configuration described above provides an inexpensive and simple yaw bearing unit which is easy to handle and easy to maintain. The present configuration also provides a quick and simple method of replacing worn or damaged pads in the yaw bearing unit compared to conventional methods.

If service or replacement of the radial pad is needed, the lower portion of the caliper structure is initially dismounted using an external tool. The lower portion is then removed to provide access to the old radial pad. The old radial pad is then removed by pulling it in a downwards axial direction, i.e. away from the nacelle. One or both stop elements may optionally be loosened prior to removing the old radial pad. A new radial pad is provided and pushed into the rebate by moving it in the opposite axial direction. The lower portion is repositioned relative to the upper portion and then remounted using the external tool. Optionally, one or both stop elements may be tightened before or after remounting the lower portion of the caliper structure. This allows for a quick and simple replacement of the radial pad whereas the conventional methods require that the entire caliper structure is removed in order to get access to the radial pad.

After removing the old radial pad, the radial surface of the upper portion may optionally be cleaned and prepared for the new radial pad.

Conventional methods require that the entire caliper structure is removed because the radial pad is fixed by means of screws which are only accessible from a radial direction. Typically, the conventional radial pad is held in place by a plurality of screws distributed along the entire peripheral edge of the pad. However, these screws form stress hot-spots and prevent the deformation of the radial pad in the circumference and axial directions. The present radial pad is not fixed along the peripheral edge and thus allows it to deform in the circumference and axial directions more freely, according to the forces and moments acting on the radial pad.

The invention further comprises a method of replacing a pad of a yaw bearing unit of a wind turbine, the wind turbine comprising a wind turbine tower, a nacelle with a mainframe, a ring gear and a flange provided at the top of the wind turbine tower, the ring gear being configured to engage at least one drive unit for yawing the nacelle relative to the wind turbine tower, the flange having an upper surface of flange, a lower surface of flange, and a radial surface of flange, the mainframe having a lower surface of mainframe facing the upper surface of flange, wherein the mainframe is slidable supported on the flange by a plurality of individual yaw bearing units arranged relative to each other, each yaw bearing unit comprising a separate caliper structure having an upper portion with an upper surface of upper portion and a lower portion with an upper surface of lower portion; the upper portion having a radial surface of upper portion facing the radial surface of flange and an upper surface of lower portion facing the lower surface of flange, wherein at least one radial pad is arranged between the radial surface of flange and the radial surface of upper portions, wherein the method comprises the steps of:

dismounting a stop element positioned adjacent to an old radial pad,
    removing the old radial pad by moving said old radial pad in one tangential direction relative to the radial surface of upper portion, the tangential direction being perpendicular to a radial direction in a plane defined by the yaw bearing units,
    moving a new radial pad into position by moving the new radial pad in the opposite tangential direction relative to the radial surface of upper portion, and
    remounting the stop element.

The present configuration described above provides an inexpensive and simple yaw bearing unit which is easy to handle and easy to maintain. The present configuration also provides a quick and simple method of replacing worn or damaged pads in the yaw bearing unit compared to conventional methods.

If service or replacement of the radial pad is needed, one of the stop elements is initially dismounted to provide access to the old radial pad using an external tool. The old radial pad is then removed by pulling in a sideward direction, i.e. in a clockwise or anti-clockwise circumference or tangential direction. A new radial pad is provided and pushed into the rebate by moving it in the opposite circumference direction. The stop element is then repositioned relative to the caliper structure and finally remounted using the external tool.

This allows for a quick and simple replacement of the radial pad, whereas the conventional methods require that the entire caliper structure is removed in order to get access to the radial pad. In conventional yaw bearing systems the radial pad is placed in a recess wherein the shoulder blogs the radial movement of the radial pad, which does not allow for a sideward replacement of the radial pad.

After removing the old radial pad, the radial surface of the upper portion may optionally be cleaned and prepared for the new radial pad.

Conventional methods require that the entire caliper structure is removed because the radial pad is fixed by means of screws which are only accessible from a radial direction. Typically, the conventional radial pad is held in place by a plurality of screws distributed along the entire peripheral edge of the pad. However, these screws form stress hot-spots and prevent the deformation of the radial pad in the circumference and axial directions. The present radial pad is not fixed along the peripheral edge and thus allows it to deform in the circumference and axial directions more freely, according to the forces and moments acting on the radial pad.

In one embodiment, said method further comprises the steps of:

dismounting an old lower pad,
    removing said old lower pad via an opening in a lower surface of lower portion of the caliper structure, the lower surface of lower portion being opposite to the upper surface of lower portion,
    moving a new lower pad into position via the opening in the lower surface of lower portion,
    remounting the new lower pad.

When service or replacement of the lower pad is needed, the respective lower pad may simply be accessed via the lower opening in the caliper structure without removing the caliper structure. The lower pad may be dismounted using another external tool, and may then be removed via the lower opening. The old lower pad may afterwards be replaced by a new lower pad. The new lower pad may be inserted into the hole via the lower opening, and may then be remounted using the external tool. This allows for a very quick and simple replacement of the lower pad, whereas the conventional methods require that the entire caliper structure is removed in order to get access to the lower pad.

In a further embodiment, said method further comprises the following steps:
dismounting said old lower pad by dismounting a part of an old adjusting mechanism connected to the old lower pad, further removing a remaining part of said old adjusting mechanism via the opening, further moving a part of a new adjusting mechanism connected to the new lower pad into position via the opening, and remounting said new lower pad by remounting a remaining part of said new adjusting mechanism.

In another further embodiment, said method further comprises the following steps:
dismounting said old lower pad by dismounting a part of an adjusting mechanism connected to the old lower pad, further removing a remaining part of said adjusting mechanism via the opening, replacing said old lower pad with the new lower pad, further moving said remaining part of the adjusting mechanism into position via the opening, and remounting said new lower pad by remounting said part of the adjusting mechanism.

If the lower pad is connected to an adjusting mechanism, then one part, e.g. the adjustable element, of the adjusting mechanism may initially be dismounted using the external tool. The remaining parts of the adjusting mechanism along with the old lower pad may then be removed via the lower opening, e.g. using another tool. Alternatively, the old lower pad and adjusting mechanism may be dismounted and removed as one unit. A lower pad and new adjusting mechanism may be provided and remounted in a reverse order. The lower pad and new adjusting mechanism, except for a corresponding one part, may be inserted via the lower opening. The one part of the new adjusting mechanism may finally be remounted to caliper structure using the external tool. Alternatively, the new lower pad and adjusting mechanism may be inserted and remounted as one unit. Optionally, the pre-tension force of the lower pad may be adjusted via the adjustable element after being mounted. This also allows for a very quick and simple replacement of the lower pad, whereas the conventional methods require that the entire caliper structure is removed in order to get access to the lower pad and the adjusting mechanism.

Instead of also replacing the old adjusting mechanism with a new adjusting mechanism, the old lower pad may simply be removed from the adjusting mechanism and replaced by a new lower pad. The lower pad, e.g. the new lower pad, may be bonded to the support element by means of an adhesive. The adhesive may for example be a one-component adhesive or a two-component adhesive, such as a methacrylate adhesive. Other types of suitable adhesives may also be used. The adhesive may be selected so that it has good adhesion properties to the material, composite or alloy of the lower pad and/or of the support element. The adhesive may for example have a shear strength of at least 35 megapascal [MPa] within a temperature span of −30° C. to +100° C. This further reduces the service costs and total service time.

The support element may have a planar, a semi-spherical, a semi-ellipsoidal, or another suitable shaped surface on which the lower pad may be arranged. Alternatively, a recess may be formed in the surface in which the lower pad may, at least partly, be arranged. The adhesive may be distributed over this surface, e.g. applied to the side and bottom surfaces of the recess.

When service or replacement of the upper pad is needed, the caliper structure may initially be dismounted to provide access to the upper pad. The mainframe and thus the nacelle may be lifted into a temporary position located above the wind turbine tower using suitable lifting or hoisting means, e.g. an external crane. The old upper pad may then be removed, e.g. in a mainly inwards radial direction. A new upper pad may be provided and inserted into the recess, e.g. in the opposite radial direction. The mainframe and thus the nacelle may then be lowered towards its initial position until it rests on the new upper pad again. Optionally, the lubricant system may be decoupled prior to removing the old upper pad and then recoupled after positioning the new upper pad. The caliper structure may finally be positioned relative to the flange and remounted to the mainframe.

DESCRIPTION OF THE DRAWING

An embodiment of the invention will now be described, by way of example only, with reference to the accompanying drawings, in which.

In the following text, the figures will be described one by one, and the different parts and positions seen in the figures will be numbered with the same numbers in the different figures. Not all parts and positions indicated in a specific figure will necessarily be discussed together with that figure.

POSITION NUMBER LIST

1. Wind turbine
2. Tower
3. Nacelle
4. Rotor
5. Hub
6. Wind turbine blades
7. Yaw bearing system
8. Mainframe
9. Caliper structure
10. Ring gear
11. Pinion gear
12. Drive unit
13. Flange
14. Upper pad
15. Radial pad
16. Lower pad 17. Yaw bearing units
18. Upper pad
19. Caliper structure
20. Upper portion
21. Lower portion
22. Mounting elements
23. Upper surface of upper portion
24. Track
25. Radial surface of upper portion
26. Radial pad
27. Stop elements
28. Side surface of caliper structure
29. Rebate
30. Tangential direction
31. Projecting element
32. Upper surface of lower portion
33. Axial direction
34. Lower pads
35. Through holes
36. Lower surface of lower portion
37. Adjusting mechanism
38. Adjustable element
39. Upper surface of flange
40. Lower surface of mainframe
41. Radial surface of flange
42. Lower surface of flange
43. Support element
44. Shaft element
45. Spring element

DETAILED DESCRIPTION OF THE INVENTION

Figure 1:
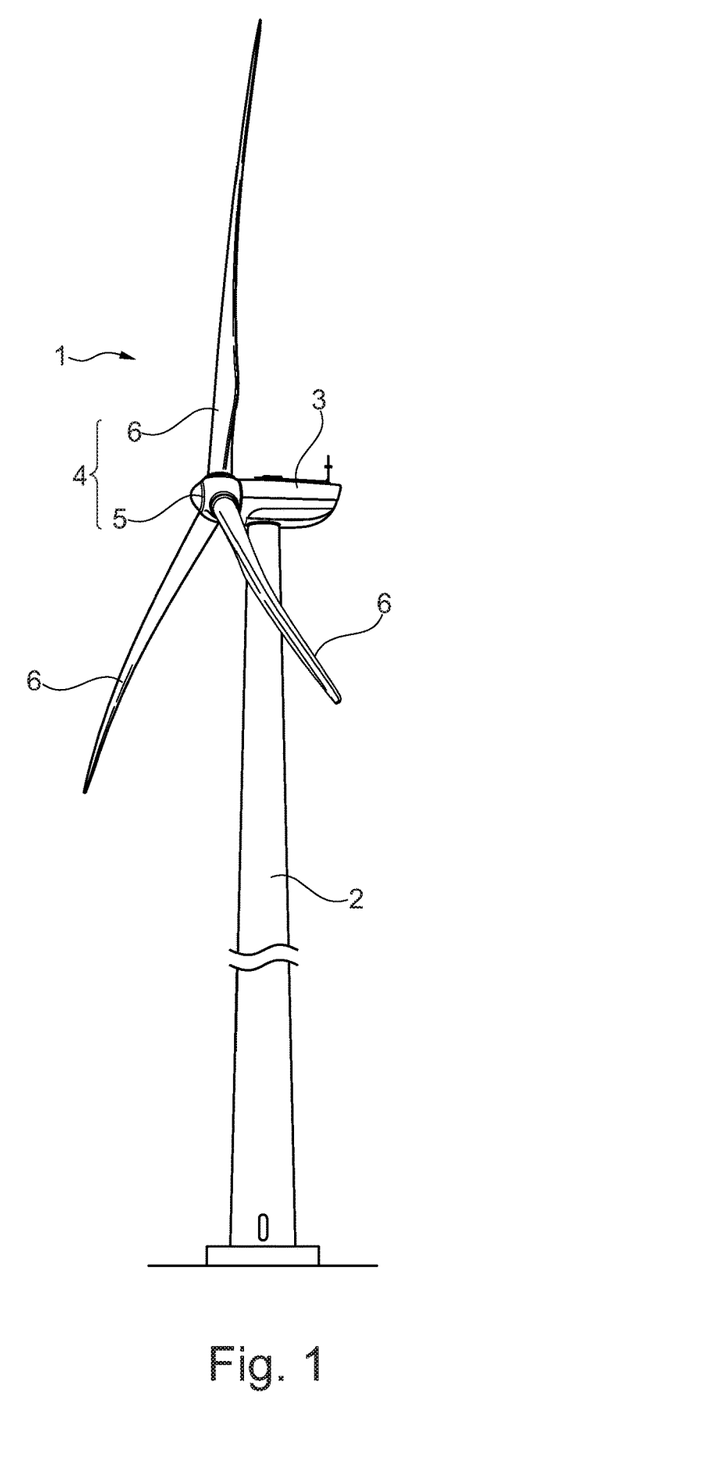
FIG. 1 shows an exemplary wind turbine comprising a yaw bearing system.

FIG. 1 shows an exemplary embodiment of a wind turbine 1, according to the invention, comprising a wind turbine tower 2 arranged on a foundation. The foundation is here shown as an onshore foundation, but also an offshore foundation may be used. A nacelle 3 is arranged on the wind turbine tower 2 via a yaw bearing system (shown in FIGS. 2 and 3). A rotor 4 is rotatably arranged relative to the nacelle 3 and comprises a hub 5 mounted to at least two wind turbine blades 6, e.g. via a pitch bearing system.

The wind turbine blades 6 are here shown as full-span wind turbine blades, but also partial-pitchable wind turbine blades may be used. The partial-pitchable wind turbine blade comprises an inner blade section and an outer blade section, wherein the pitch bearing system is arranged between the two blade sections.

Figure 2:
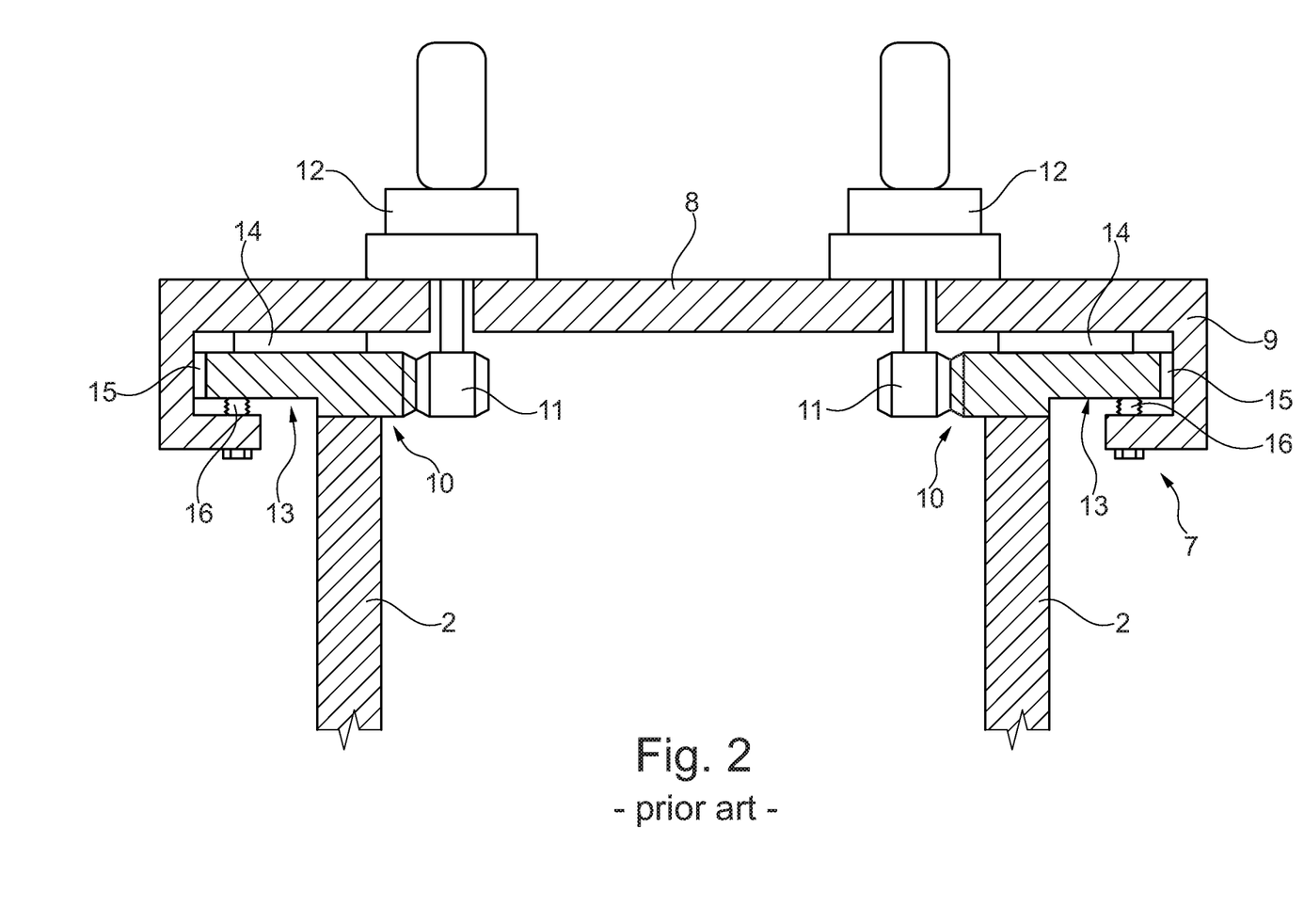
FIG. 2 shows a conventional yaw bearing system.

FIG. 2 shows a conventional yaw bearing system 7 arranged between the wind turbine tower 2 and the nacelle 3. Here, only a part of a mainframe 8 of the nacelle 3 is shown for illustrative purposes. The mainframe 8 is connected to a U-shaped caliper structure 9 which forms two radial extending legs facing the wind turbine tower 2. The caliper structure 9 is here shown as part of the mainframe 8, however, the caliper structure 9 may be a separate structure mounted to the lower surface of the mainframe 8.

The wind turbine tower 2 is mounted to a ring gear 10 having a plurality of teeth configured to engage a plurality of complementary teeth of a pinion gear 11 which is rotatably connected to a drive unit 12, e.g. a yaw motor. Here, two sets of drive units 12 and pinion gears 11 are shown. The ring gear 10 further comprises a flange 13 extending in a radial direction. The flange 13 is situated between the radial extending legs of the caliper structure 9. An upper pad 14, a radial pad 15, and a lower pad 16 are arranged on the caliper structure 9 and are facing the flange 13 as shown in FIG. 2. The caliper structure 9 is able to slide along the outer surfaces of the flange via the respective pads 14, 15, 16.

Figure 3:
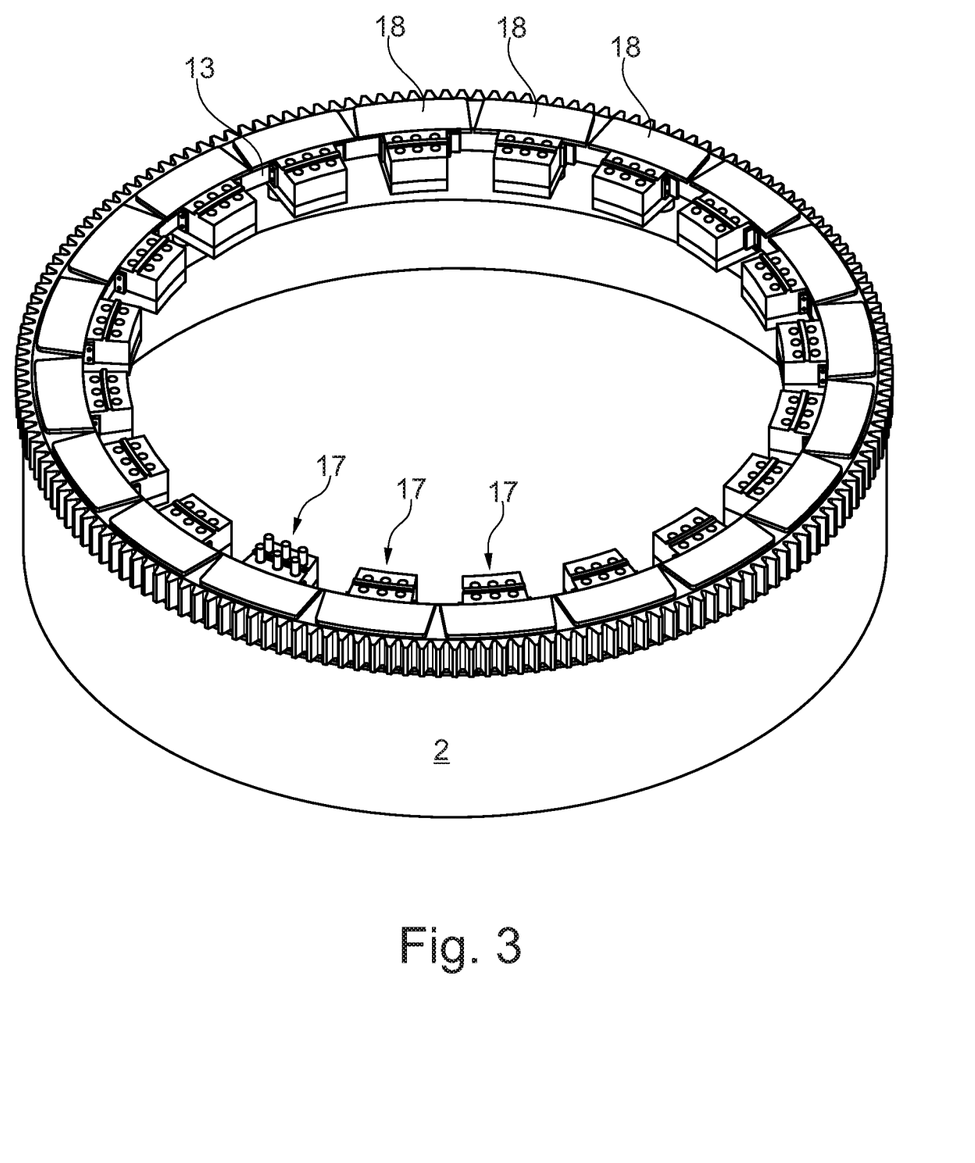
FIG. 3 shows an exemplary embodiment of the yaw bearing system according to the invention.

FIG. 3 shows an exemplary embodiment of the yaw bearing system, according to the invention, comprising a plurality of individual yaw bearing units 17 distributed along the circumference of the flange 13. Here, the engaging teeth are arranged on the outer side of the ring gear 10 while the flange is extending inwards towards a centre axis of the wind turbine tower 2.

Each yaw bearing unit 17 is configured as a separate unit which is spaced apart from an adjacent yaw bearing unit 17. Each yaw bearing unit 17 comprises an upper pad 18 arranged relative to the flange 13.

A predetermined number of yaw bearing units 17 are distributed along the circumference of the flange 13. Here, twenty yaw bearing units 17 are shown, however, this number may be increased or reduced depending on the desired application. This reduces the tilting moment and the axial force acting on each yaw bearing unit, and reduces the weight and costs of each yaw bearing unit.

Figure 4:
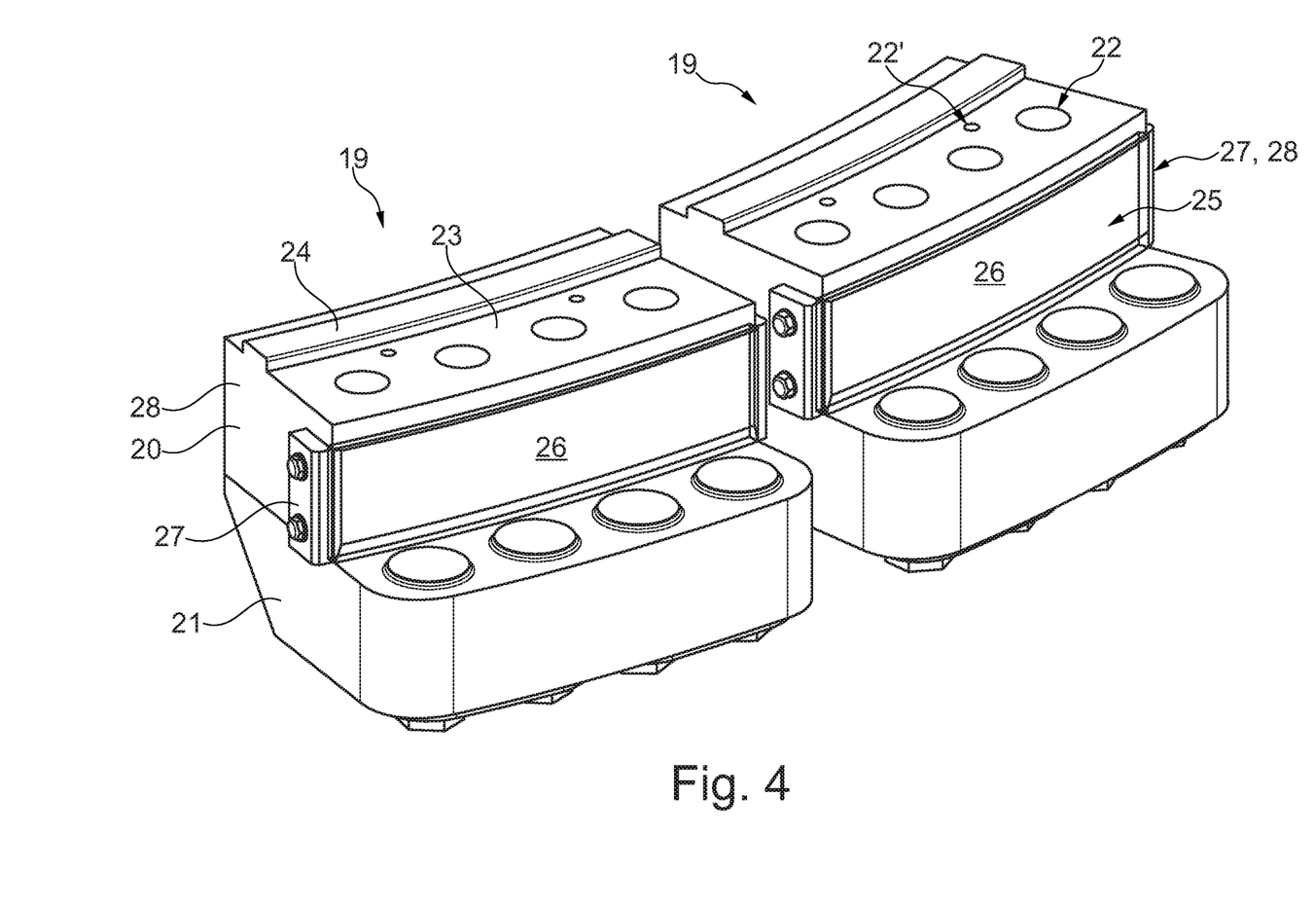
FIG. 4 shows the caliper structure of two adjacent yaw bearing units.

FIG. 4 shows the caliper structure 19 of two adjacent yaw bearing units 17 wherein each caliper structure 19 has an L-shaped structure. The caliper structure 19 is divided into an upper portion 20 extending in an axial direction and a lower portion 21 extending in a radial direction. The lower and upper portions 20, 21 comprise a first set of mounting elements 22, here four is shown, in the form of mounting holes for receiving separate fastener elements, such as bolts, (shown in FIGS. 8 and 9). The mounting elements 22 extend from an upper surface 23 of the upper portion 20 to a lower surface of the lower surface of the lower portion 21. The upper portion 20 further comprises a second set of mounting elements 22' for receiving another set of fastener elements.

Figure 8:
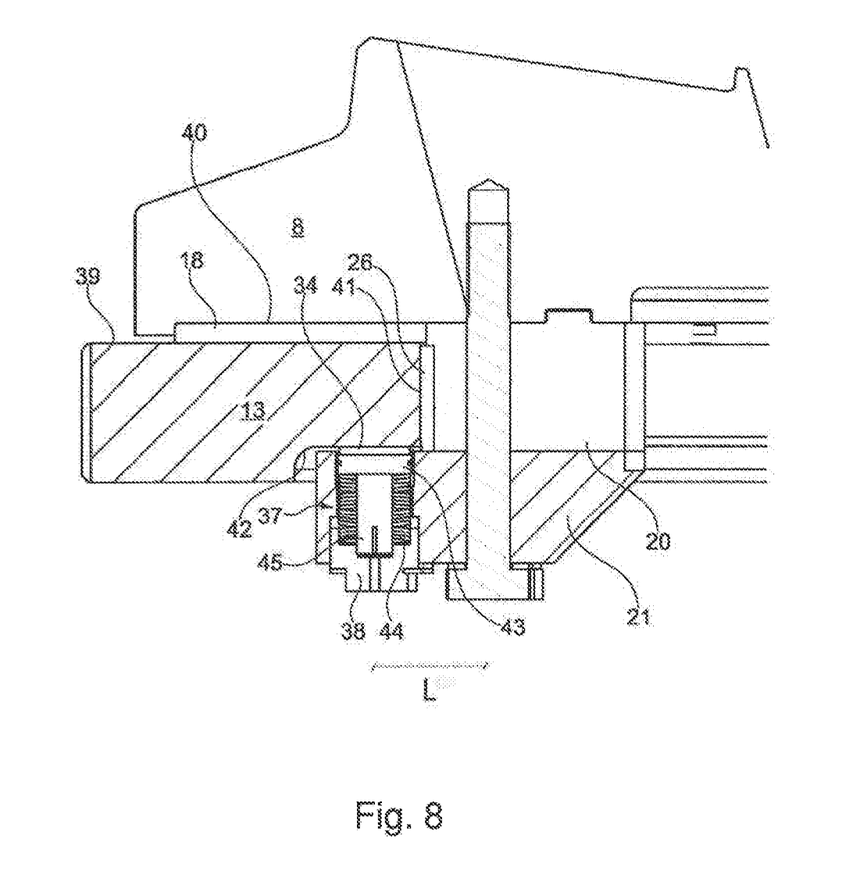
FIG. 8 shows a cross-sectional view of a first embodiment of the yaw bearing unit according to the invention.
Figure 9:
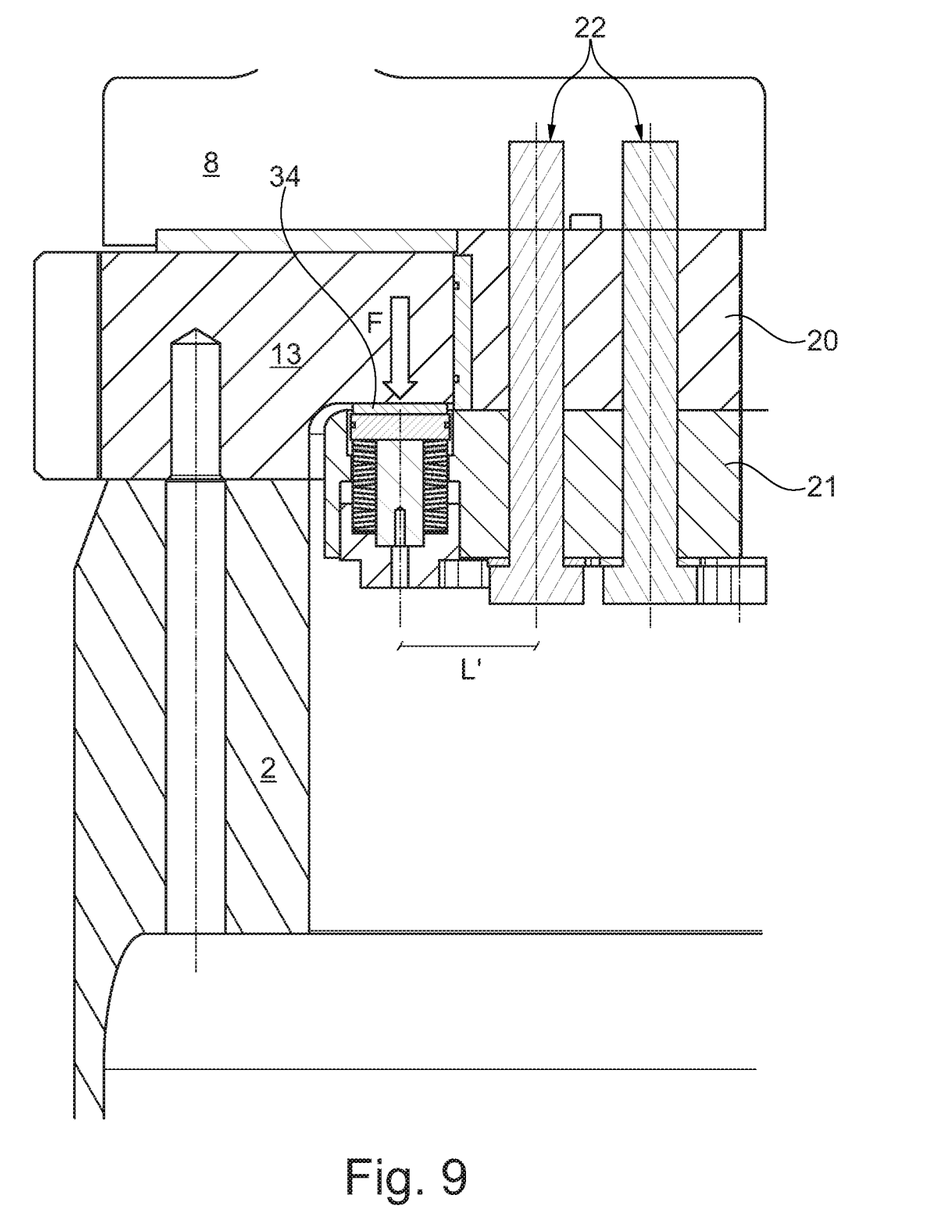
FIG. 9 shows a cross-sectional view of a second embodiment of the yaw bearing unit according to the invention.

At least one track 24 is optionally arranged on the upper surface 23, wherein this track 24 extends along the length of the respective yaw bearing unit 17. The mainframe 8 optionally comprises at least one complementary recess for receiving the track 24 as shown in FIGS. 8 and 9. The track 24 and complementary recess are used to position the individual yaw bearing units 17 correctly relative to the flange 13, and they also prevent the yaw bearing units 17 from moving in a radial direction.

Figure 5:
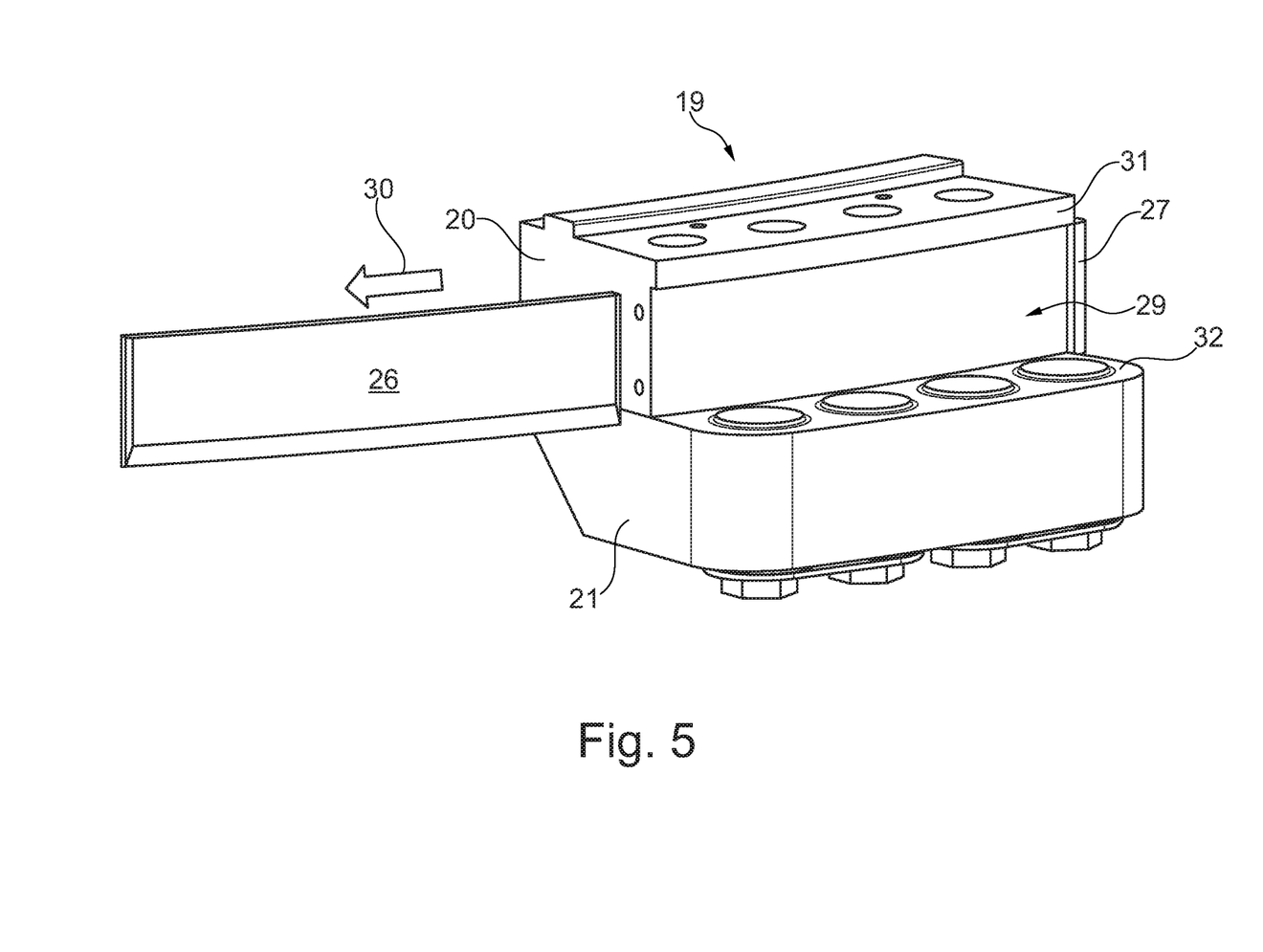
FIG. 5 shows a first embodiment of a method for replacing the radial pad according to the invention.
Figure 6:
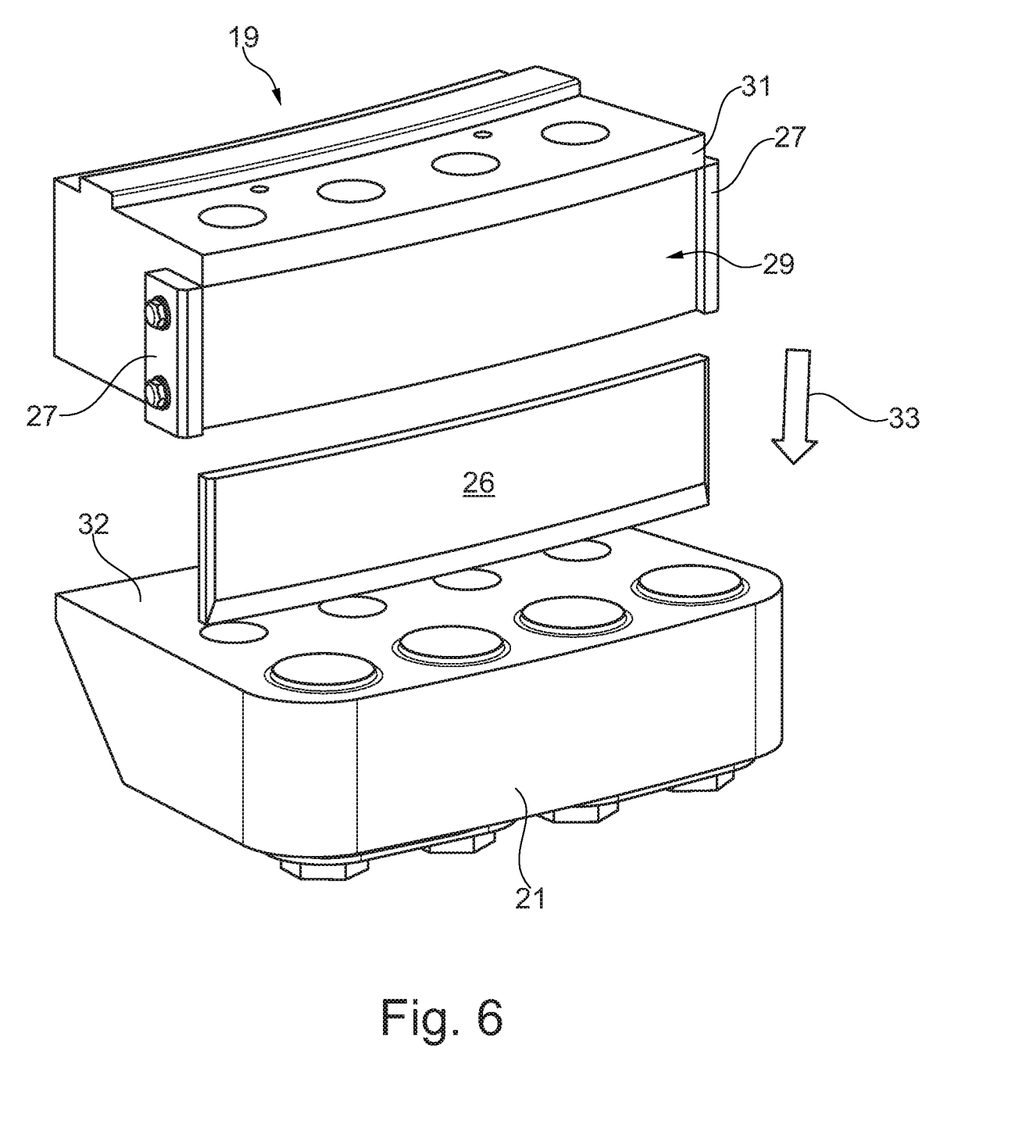
FIG. 6 shows a second embodiment of the method for replacing the radial pad.

The caliper structure 19, e.g. the upper portion 20, has a radial surface 25 facing the flange 13 as shown in FIGS. 8 and 9. A rebate and a projecting elongated element are formed in the radial surface 25 as shown in FIGS. 5 and 6. A radial pad 26 is arranged in the rebate as shown in FIG. 4. A pair of stop elements 27 is arranged on opposite sides of the radial pad 26. The stop elements 27 are removable stop elements mounted to a side surface 28 of the caliper structure 19, e.g. the upper portion. This prevents the radial pad 26 from moving in a circumference direction during yawing.

FIG. 5 shows a first embodiment of a method for replacing the radial pad 26, wherein the radial pad 26 is accessed from a sideward or tangential direction. In event that replacement is required, e.g. due to wear or other conditions, one of the stop elements 27 is demounted and removed. The old radial pad 26 is then pulled out of the rebate 29 in the tangential direction (indicated by arrow 30). A new radial pad 26 is pushed into the rebate 29 in the opposite direction until it reaches contact with the other stop element 27. The stop element 27 is then repositioned and remounted to the caliper structure 19. This allows for a simple and quick replacement of the radial pad without having to remove the caliper structure first.

As clearly shown in FIGS. 5 and 6, the rebate 29 extends along the entire length of the radial surface 25. The rebate 29 further extends from the projecting element 31 to the lowermost edge of the upper portion 20 in the axial direction. The radial pad 26 contacts the projecting element 31, the stop elements 27, and the upper surface 32 of the lower portion 21 as clearly indicated in FIG. 4. This increases the total surface area of radial pad 26, which, in turn, reduces the edge pressure applied to the stop elements 27.

FIG. 6 shows a second embodiment of the method for replacing the radial pad 26, wherein the radial pad 26 is accessed from the axial direction. In the event that replacement is required, e.g. due to wear or other conditions, the lower portion 21 of the caliper structure 19 is demounted and removed. The old radial pad 26 is then pulled out of the rebate 29 in the axial direction (indicated by arrow 33). A new radial pad 26 is pushed into the rebate 29 in the opposite direction until it reaches contact with the projecting element 31. The lower portion 21 is repositioned and remounted to the upper portion 20 of the caliper structure 19. This also allows for a simple and quick replacement of the radial pad as only part of the caliper structure has to be removed first.

Figure 7:
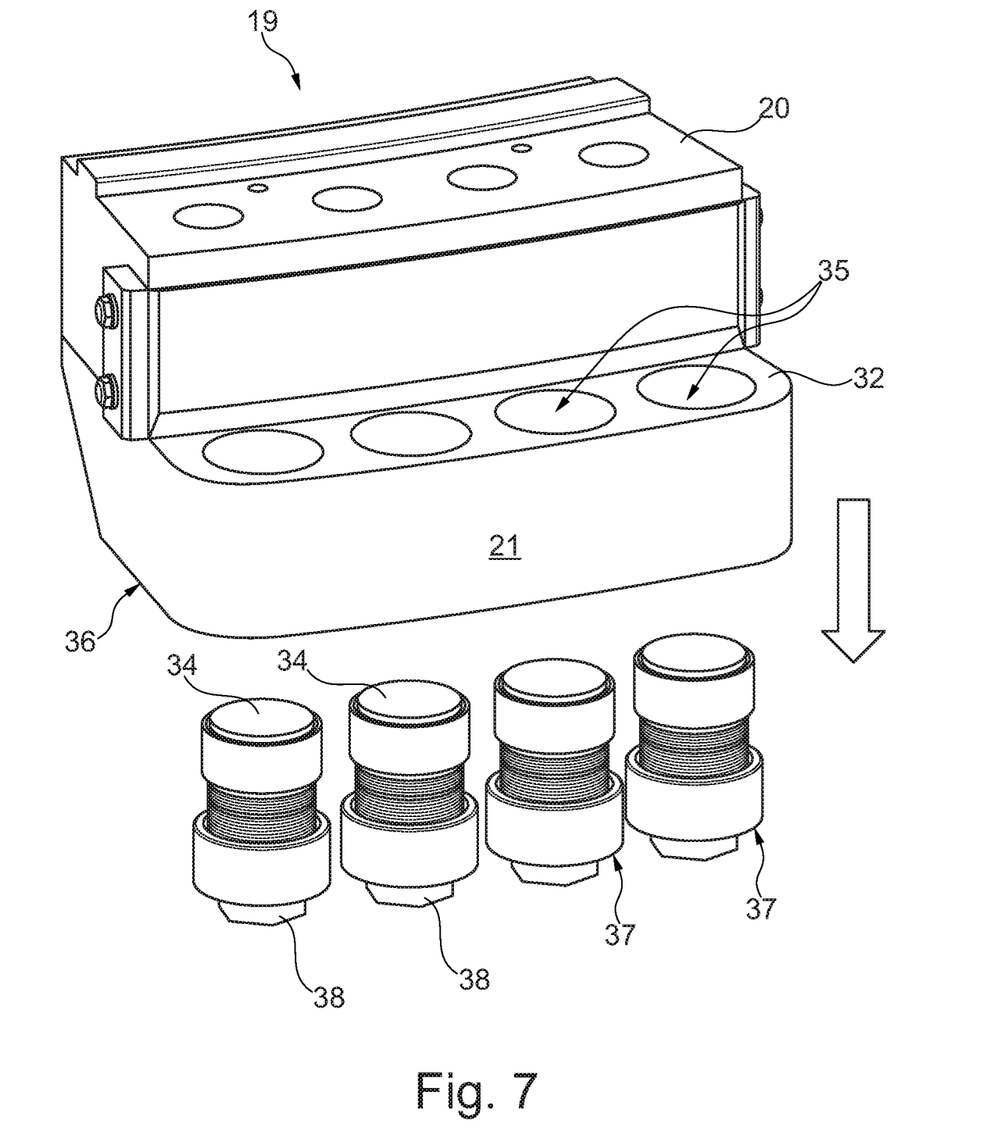
FIG. 7 shows a method for replacing the lower pad according to the invention.

FIG. 7 shows a method for replacing the lower pad 34, wherein the lower pad 34 is accessed via an opening in a lower surface of the lower portion. The lower portion 21 comprises a number of through holes 35 in which the individual lower pads 34 are at least partly arranged. The through holes 35 extend from the upper surface 32 to the lower surface 36 of the lower portion 21. The lower pad 34 is connected to an adjusting mechanism 37 configured to adjust the pre-tension force of the lower pad 34 as indicated in FIGS. 8 and 9. The adjusting mechanism 37 comprises an adjustable element 38 in the form of a bolt head. The adjusting mechanism 37 is arranged in the through hole 35 and can be engaged by an external tool from the bottom side of the caliper structure 19.

In the event that replacement is required, e.g. due to wear or other conditions, the adjustable element 38 is demounted and removed. The remaining parts of the adjusting mechanism 37 and the old lower pad 34 are then removed via the opening (shown in FIGS. 8 and 9) in the lower surface 36. The old lower pad 34 is removed from a support element (shown in FIGS. 8 and 9) of the adjusting mechanism 37 and a new lower pad 34 is placed on the support element, e.g. using an adhesive. The new lower pad 34 and the above-mentioned remaining part are then repositioned inside the through hole 35 via the opening in the lower surface 36. Finally, the adjustable element 38 is repositioned and remounted to the lower portion 21. This enables the lower pad 34 to be replaced without having to remove the caliper structure first.

FIGS. 8 and 9 show a cross-sectional view of a first and a second embodiment of the yaw bearing unit 17, wherein the upper pad 18 is arranged in a recess (not shown) in the upper surface 39 of the flange 13. Further, the upper pad 18 is in slidable contact with a lower surface 40 of the mainframe 8. The radial pad 26 is in slidable contact with a radial surface 41 of the flange 13. The lower pad 34 is in slidable contact with a lower surface 42 of the flange 13.

The upper pad 18 is formed as a single continuous pad made of thermoplastic polymer having an optimal length, width, and thickness. Test results have shown that an optimal balance between the edge pressure of the upper pad 18 and the shape of the upper pad 18 is achieved when the upper pad 18 has a length of 120 millimetres to 500 millimetres, a width of 100 millimetres to 250 millimetres, and a thickness of 15 millimetres to 20 millimetres.

The adjusting mechanism 37 has a support element 43 on which the lower pad 34 is situated. The support element 43 is further connected to a shaft element 44 configured to contact the adjustable element 38 and thus limit the downwards axial movement of the lower pad 34. A spring element 45 is arranged between the support element 43 and the adjustable element 38 and is configured to bias the downwards axial movement of the lower pad 34.

The mounting elements 22 in the caliper structure 19 may be arranged in one row as shown in FIGS. 4 and 8. The yaw bearing unit 17 has a distance, L, measured in the radial direction between a centre axis of one lower pad 34 and a centre axis of one mounting element 22. This distance L defines a moment arm (indicated by arrow F in FIG. 9) for transferring tilting moments from the nacelle 3 to the wind turbine tower 2 via the flange 13.

The mounting elements 22 may advantageously be arranged in two rows as shown in FIGS. 3 and 9. The distance L' to an adjacent mounting element 22 is then reduced to a range of 80 millimetres to 100 millimetres. This configuration enables the eccentricity and the individual bolt forces to be reduced which, in turn, enable the width of the yaw bearing unit 17 and the width of the flange 13 to be reduced.

The invention claimed is:

1. A wind turbine (1) comprising a wind turbine tower (2), a nacelle (3) with a mainframe (8), a ring gear (10) and a flange (13) provided at the top of the wind turbine tower (2), the ring gear (10) being configured to engage at least one drive unit (12) for yawing the nacelle (3) relative to the wind turbine tower (2), the flange (13) having an upper surface (39), a lower surface (42), and a radial surface (41), the mainframe (8) having a lower surface (40) facing the upper surface of the flange (39), wherein the mainframe (8) is slidable supported on the flange (13) by a plurality of individual yaw bearing units (17) arranged relative to each other, each yaw bearing unit (17) comprising a separate caliper structure (19), the caliper structure having an upper portion (20) with an upper surface (23) and a lower portion (21) with an upper surface; the upper portion (20) having a radial surface (25) facing the radial surface of the flange (41) and the upper surface (23) facing the lower surface of the flange (42), wherein at least one upper pad (18) is arranged between the upper surface of flange (39) and the lower surface of mainframe (40), wherein at least one radial pad (26) is arranged between the radial surface of the flange (41) and the radial surface of the upper portion (25) of the caliper structure (19), the at least one radial pad (26) has a lower edge contacting the upper surface of the lower portion (32) and extends along the entire length of the radial surface of the upper portion (25) and wherein the yaw bearing unit (17) further comprises at least one removable stop element (27) configured to be mounted to at least one side surface of the upper portion (20).

2. A wind turbine (1) according to claim 1, wherein the upper portion (20) extends in an axial direction of the tower and of the ring gear and the lower portion (21) is removable and extends in a radial direction of the ring gear when mounted, wherein the upper portion (20) is configured to be mounted to the mainframe (8) and the lower portion (21) is configured to be mounted to the upper portion (20).

3. A wind turbine (1) according to claim 1, wherein said lower portion (21) comprises at least one through hole (35) connected to a first opening in the upper surface of the lower portion (32) and a second opening in a lower surface of the lower portion (36), wherein at least one lower pad (34) is at least partly positioned inside said at least one through hole (35) and contacts the lower surface of the flange (42), the at least one lower pad (34) being accessible via the second opening.

4. A wind turbine (1) according to claim 3, wherein at least one of the lower pads (34) is connected to an adjusting mechanism configured to adjust a pretension force of the at least one lower pad (34).

5. A wind turbine (1) according to claim 3, wherein said caliper structure (19) has a radial distance, L, measured in the radial direction of the ring gear between a centre axis of a lower pad (34) and a centre axis of a mounting element (22), wherein the radial distance is between 80 millimetres and 100 millimetres.

6. A wind turbine (1) according to claim 1, wherein said caliper structure (19) comprises at least two rows of mounting element holes, for mounting to the mainframe (8).

7. A wind turbine (1) according to claim 1, wherein the plurality of yaw bearing units (17) are distributed along a circumference of the flange, the plurality including between 15 and 25 yaw bearing units.

8. A wind turbine (1) according to claim 1, wherein said at least one upper pad (18) is formed by a single pad made of thermoplastic polymer, the single pad having at least:
- a length of 120 millimetres to 500 millimetres, the length being measured along a central arc line,
- a width of 100 millimetres to 250 millimetres, the width being measured perpendicular to the central arc line, or
- a thickness of 15 millimetres to 20 millimetres, the thickness being measured perpendicular to the central arc line and the width.

9. A method of replacing a pad of a yaw bearing unit (17) of a wind turbine (1), the wind turbine (1) comprising a wind turbine tower (2), a nacelle (3) with a mainframe (8), a ring gear (10) and a flange (13) provided at the top of the wind turbine tower (2), the ring gear (10) being configured to engage at least one drive unit (12) for yawing the nacelle (3) relative to the wind turbine tower (2), the flange (13) having an upper surface (39), a lower surface (42), and a radial surface (41), the mainframe (8) having a lower surface (40) facing the upper surface of the flange (39), wherein the mainframe (8) is slidable, supported on the flange (13) by a plurality of individual yaw bearing units (17), arranged relative to each other, each yaw bearing unit (17) comprising a separate caliper structure (19) having an upper portion (20) with an upper surface (23) and a lower portion (21) with a upper surface (32); the upper portion (20) having a radial surface (25) facing the radial surface of the flange (41), and the upper surface of the upper portion (23) facing the lower surface of the flange (42), wherein at least one radial pad (26) is arranged between the radial surface of the flange (41) and the radial surface of the upper portion (25), wherein the method comprises the steps of:
- dismounting a stop element (27) positioned adjacent to an old radial pad (26),
- removing the old radial pad (26) by moving said old radial pad (26) in a tangential direction (30) relative to the radial surface of the upper portion (25),
- moving a new radial pad (26) into position by moving the new radial pad (26) in an opposite tangential direction (30) relative to the radial surface of the upper portion (25), and
- remounting the stop element (27).

* * * * *